(12) United States Patent
Gonze et al.

(10) Patent No.: US 7,686,857 B2
(45) Date of Patent: Mar. 30, 2010

(54) ZONE HEATED DIESEL PARTICULATE FILTER ELECTRICAL CONNECTION

(75) Inventors: Eugene V. Gonze, Pinckney, MI (US); Michael J. Paratore, Jr., Howell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 432 days.

(21) Appl. No.: 11/561,108

(22) Filed: Nov. 17, 2006

(65) Prior Publication Data

US 2007/0227104 A1 Oct. 4, 2007

Related U.S. Application Data

(60) Provisional application No. 60/786,060, filed on Mar. 24, 2006.

(51) Int. Cl.
*B01D 39/00* (2006.01)

(52) U.S. Cl. ............... 55/282.3; 55/385.3; 55/DIG. 10; 55/DIG. 30; 60/303; 60/311

(58) Field of Classification Search ................ 55/282.3, 55/385.3, 466, 523, DIG. 10, DIG. 30; 60/300, 60/303, 311; 422/174, 177, 179, 180
See application file for complete search history.

(56) References Cited

U.S. PATENT DOCUMENTS

| 4,505,726 | A | | 3/1985 | Takeuchi | |
|---|---|---|---|---|---|
| 4,516,993 | A | | 5/1985 | Takeuchi | |
| 5,203,166 | A | * | 4/1993 | Miller | ............... 60/274 |
| 5,259,190 | A | * | 11/1993 | Bagley et al. | ............ 60/300 |
| 2005/0232827 | A1 | * | 10/2005 | Merry | ............... 422/179 |
| 2007/0062181 | A1 | * | 3/2007 | Williamson et al. | ........ 60/297 |

* cited by examiner

*Primary Examiner*—Michael A Marcheschi
*Assistant Examiner*—Karla Hawkins

(57) ABSTRACT

An electrical connection system for a particulate filter is provided. The system includes: a particulate filter (PF) disposed within an outer shell wherein the PF is segmented into a plurality of heating zones; an outer mat disposed between the particulate filter and the outer shell; an electrical connector coupled to the outer shell of the PF; and a plurality of printed circuit connections that extend along the outer surface of the PF from the electrical connector to the plurality of heating zones.

7 Claims, 5 Drawing Sheets

ZONE HEATED DIESEL PARTICULATE FILTER ELECTRICAL CONNECTION

CROSS-REFERENCE TO RELATED APPLICATIONS

This application claims the benefit of U.S. Provisional Application No. 60/786,060, filed on Mar. 24, 2006. The disclosure of the above application is incorporated herein by reference.

STATEMENT OF GOVERNMENT RIGHTS

Certain of the subject matter of the present application was developed under Contract Number DE-FC-04-03AL67635 awarded by the Department of Energy. The U.S. government has certain rights in this invention.

FIELD

The present disclosure relates to methods and systems for heating particulate filters.

BACKGROUND

The statements in this section merely provide background information related to the present disclosure and may not constitute prior art.

Diesel engines typically have higher efficiency than gasoline engines due to an increased compression ratio and a higher energy density of diesel fuel. A diesel combustion cycle produces particulates that are typically filtered from diesel exhaust gas by a particulate filter (PF) that is disposed in the exhaust stream. Over time, the PF becomes full and the trapped diesel particulates must be removed. During regeneration, the diesel particulates are burned within the PF.

Conventional regeneration methods inject fuel into the exhaust stream after the main combustion event. The post-combustion injected fuel is combusted over one or more catalysts placed in the exhaust stream. The heat released during the fuel combustion on the catalysts increases the exhaust temperature, which burns the trapped soot particles in the PF. This approach, however, can result in higher temperature excursions than desired, which can be detrimental to exhaust system components including the PF.

SUMMARY

Accordingly, an electrical connection system for a particulate filter is provided. The system includes: a particulate filter (PF) disposed within an outer shell wherein the PF is segmented into a plurality of heating zones; an outer mat disposed between the particulate filter and the outer shell; an electrical connector coupled to the outer shell of the PF; and a plurality of printed circuit connections that extend along the outer surface of the PF from the electrical connector to the plurality of heating zones.

In other features, an exhaust system that processes exhaust generated by an engine is provided. The system includes: a particulate filter (PF) that is disposed downstream of the engine and that filters particulates from the exhaust; a grid that is applied to an exterior upstream surface of the PF and that is segmented by non-conductive material into a plurality of zones wherein each zone includes a pathway of electrically resistive material; and an electrical connector that connects to the particulate filter and that supplies power to the electrically resistive material of each of the plurality of zones.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
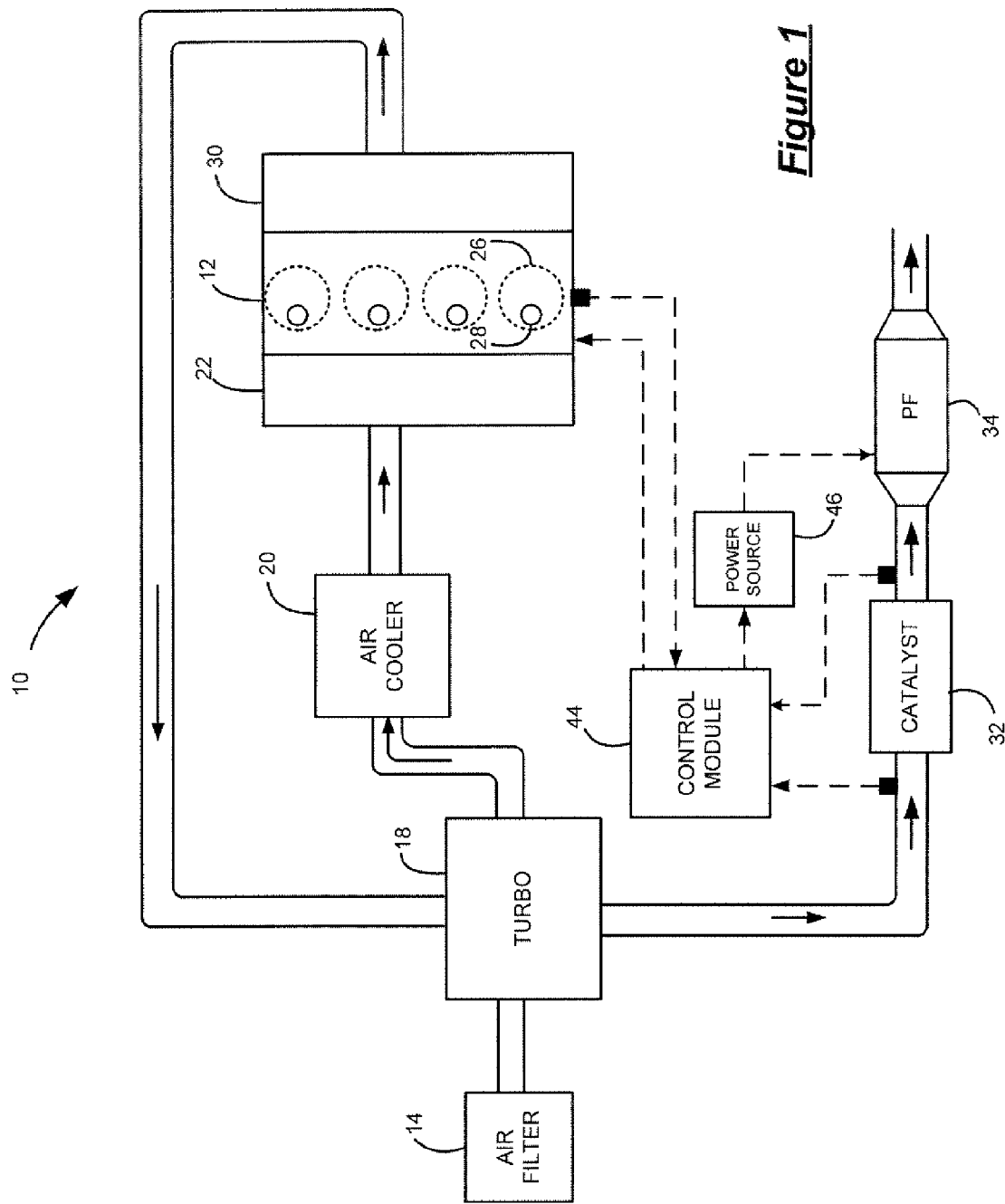
FIG. 1 is a functional block diagram of a vehicle including a particulate filter.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary diesel engine system 10 is schematically illustrated in accordance with the present invention. It is appreciated that the diesel engine system 10 is merely exemplary in nature and that the zone heated particulate filter regeneration system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 10 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, it is appreciated that the systems and methods of the present invention can be implemented in engines having a plurality of cylinders including, but not limited to, 2, 3, 4, 5, 6, 8, 10 and 12 cylinders. It is also appreciated that the systems and methods of the present invention can be implemented in a v-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PF) 34. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32 and the PF 34. The DOC 32 oxidizes the exhaust based on the post combustion air/fuel ratio. The amount of oxidation increases the temperature of the exhaust. The PF 34 receives exhaust from the DOC 32 and filters any soot particulates present in the exhaust.

A control module 44 controls the engine and PF regeneration based on various sensed information. More specifically, the control module 44 estimates loading of the PF 34. When the estimated loading achieves a threshold level (e.g., 5 grams/liter of particulate matter) and the exhaust flow rate is within a desired range, current is controlled to the PF 34 via a power source 46 to initiate the regeneration process. The duration of the regeneration process varies based upon the amount of particulate matter within the PF 34. It is anticipated, that the regeneration process can last between 4-6 minutes. Current is only applied, however, during an initial portion of the regeneration process. More specifically, the electric energy heats the inlet of the PF for a threshold period (e.g., 1-2 minutes). The remainder of the regeneration process is achieved using the heat generated by combustion of particulate matter present on the heated inlet of the PF 34.

Figure 2:
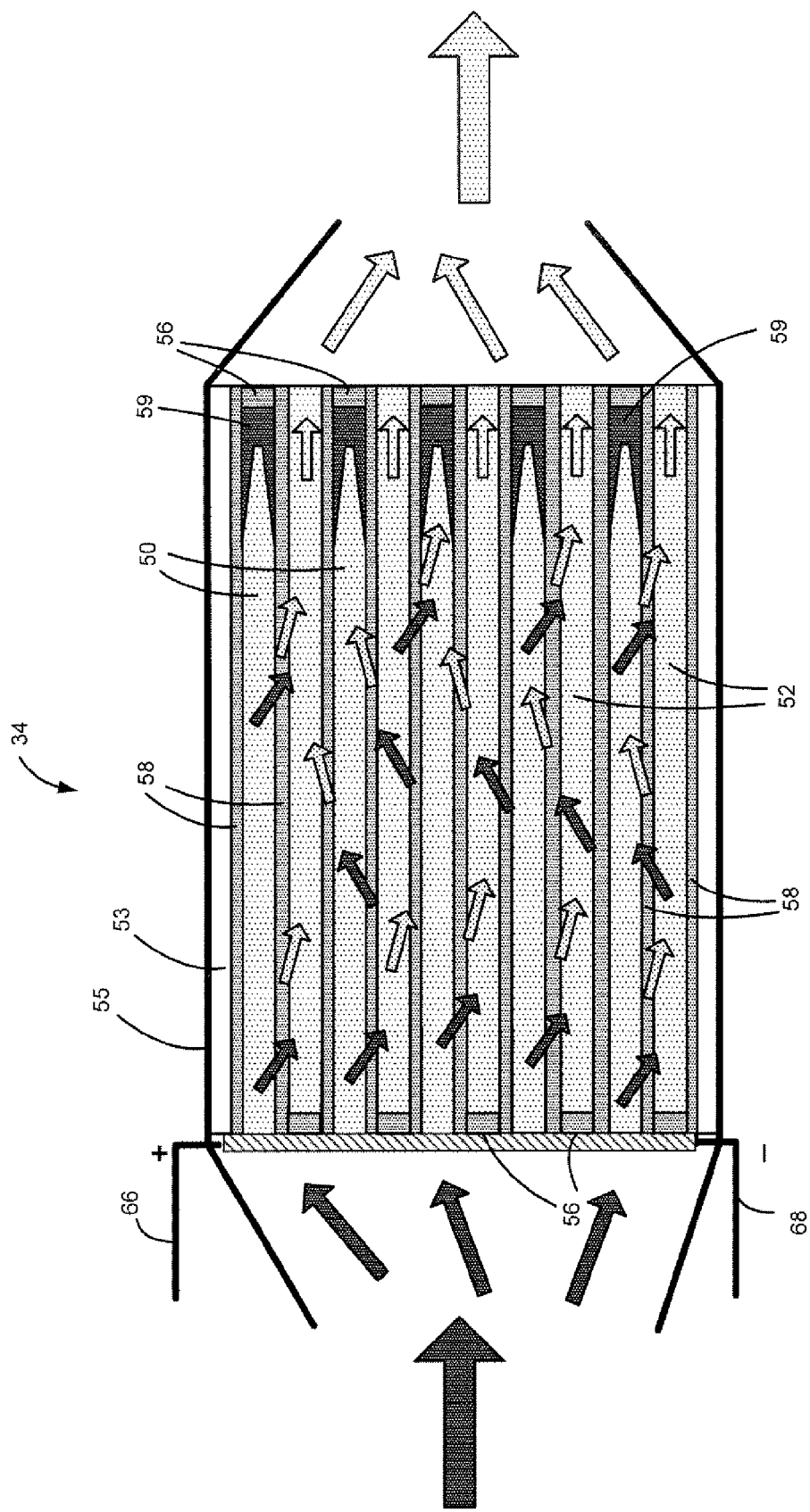
FIG. 2 is a cross-sectional view of a wall-flow monolith particulate filter.

With particular reference to FIG. 2, the PF 34 is preferably a monolith particulate trap and includes alternating closed cells/channels 50 and opened cells/channels 52. A PF mat material 53 surrounds the monolith particulate trap. An outer shell 55 surrounds the PF mat 53. The cells/channels 50,52 are typically square cross-sections, running axially through the part. Walls 58 of the PF 34 are preferably comprised of a porous ceramic honeycomb wall of cordierite material. It is appreciated that any ceramic comb material is considered within the scope of the present invention. Adjacent channels are alternatively plugged at each end as shown at 56. This forces the diesel aerosol through the porous substrate walls which act as a mechanical filter. Particulate matter is deposited within the closed channels 50 and exhaust exits through the opened channels 52. Soot particles 59 flow into the PF 34 and are trapped therein.

For regeneration purposes, a grid 64 including an electrically resistive material is attached to the front exterior surface referred to as the front face of the PF 34. Current is supplied to the resistive material to generate thermal energy. It is appreciated that thick film heating technology may be used to attach the grid 64 to the PF 34. For example, a heating material such as Silver or Nichrome may be coated then etched or applied with a mask to the front face of the PF 34. In various other embodiments, the grid is composed of electrically resistive material such as stainless steel and attached to the PF using a ceramic adhesive. It is also appreciated that the resistive material may be applied in various single or multi-path patterns. Exhaust passing through the PF 34 carries thermal energy generated at the front face of the PF 34 a short distance down the channels 50,52. The increased thermal energy ignites particulate matter present near the inlet of the PF 34. The heat generated from the combustion of the particulates is then directed through the PF to induce combustion of the remaining particulates within the PF.

Figure 3:
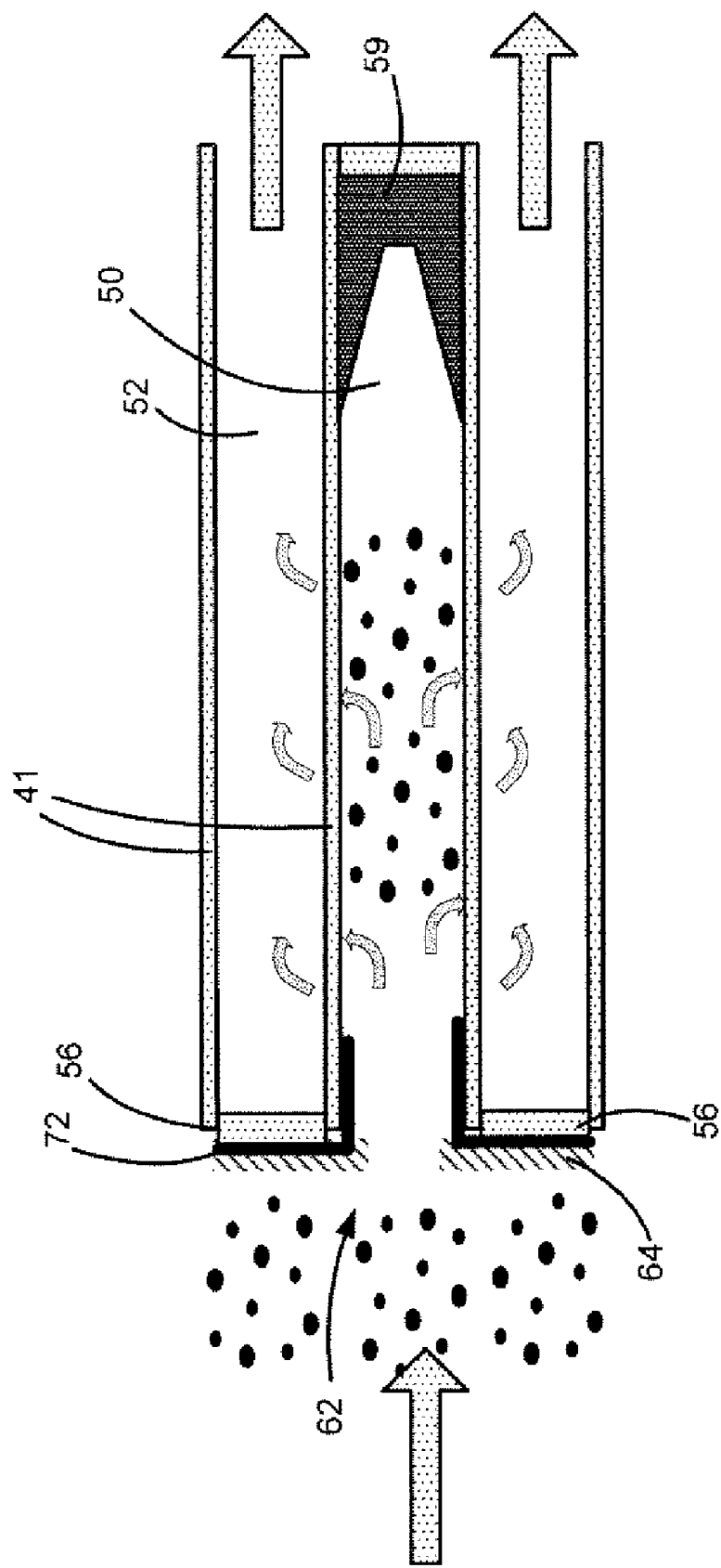
FIG. 3 is a cross-sectional view of a portion of the PF of FIG. 2.

With particular reference to FIG. 3, a thermally conductive coating 72 can be additionally applied at the inlets 62 of the channels 50,52. The coating 72 can extend a short distance down the opened ends of the closed channels 50. In various embodiments, the conductive coating extends within an inch of the front face of the PF. The resistive material of the grid 64 contacts the conductive coating 72. Thermal energy is transferred to the conductive coating 72 when electrical energy passes through the resistive material. Heat from the conductive coating 72 ignites particulate matter present near the inlet of the PF 34.

Figure 4:
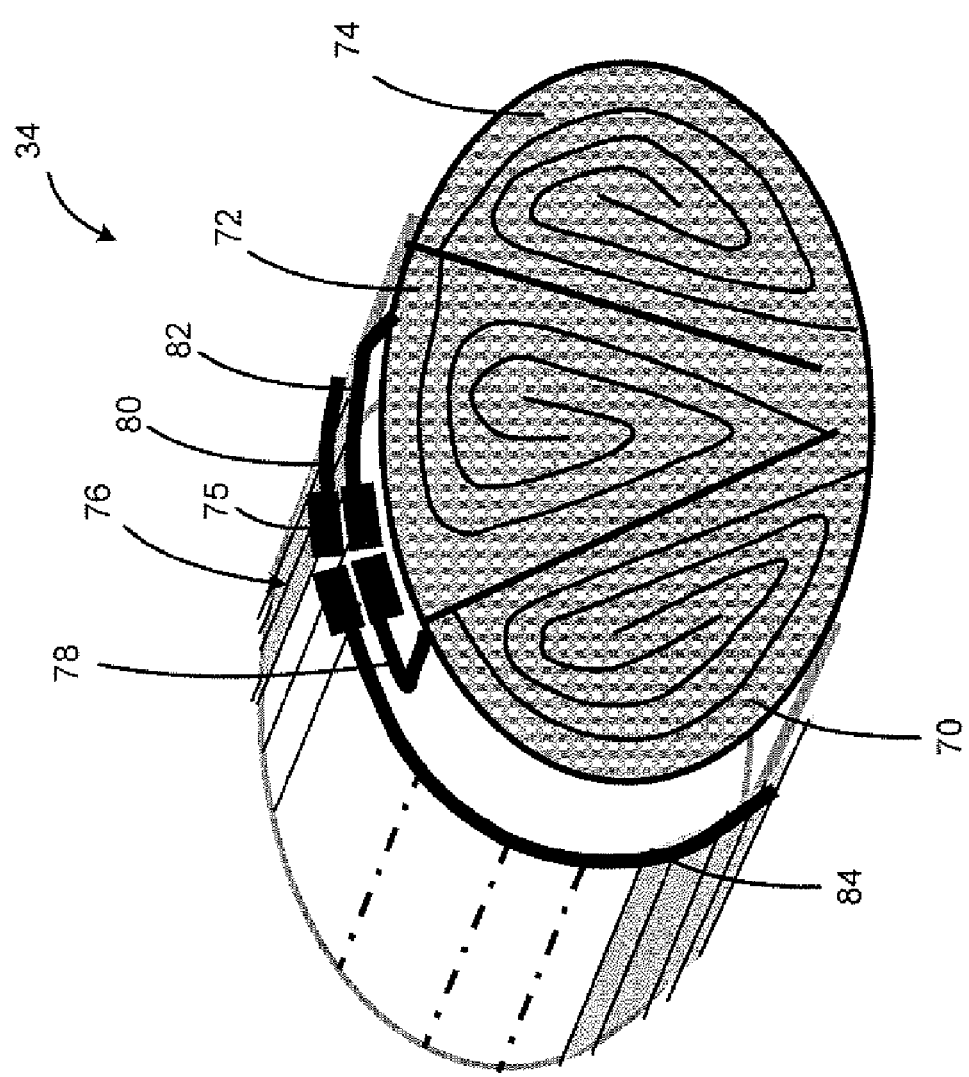
FIG. 4 is a perspective view of a front face of the PF.

With reference to FIG. 4, to reduce the electrical impact on the vehicle during regeneration, the grid 64 of the PF 34 can be segmented into a plurality of zones. Each zone can be heated separately by supplying power to a resistive pathway located within each zone. It is appreciated that the face of the PF 34 may be heated by segmenting the PF into a plurality of zones according to a plurality of formats and therefore is not limited to the current example. As shown in FIG. 4, the grid of the PF is divided into three zones 70-74. A single electrical connector 76 may be incorporated into the PF 34 to receive electrical energy from the power source 46 (FIG. 1). Printed circuit connections 78-84 extend from the electrical connection to the zones 70-74 around the outer surface of the PF 34. The printed circuit connections are conductive pathways or traces etched onto the non-conductive substrate of the PF. Pads 75 receive electrical energy from an electrical connector (as will be discussed in more detail below) and transmit electrical energy to the printed circuit connections 78-84. The printed circuit connections 78-84 then transmit the electrical energy to each of the zones 70-74.

Figure 5:
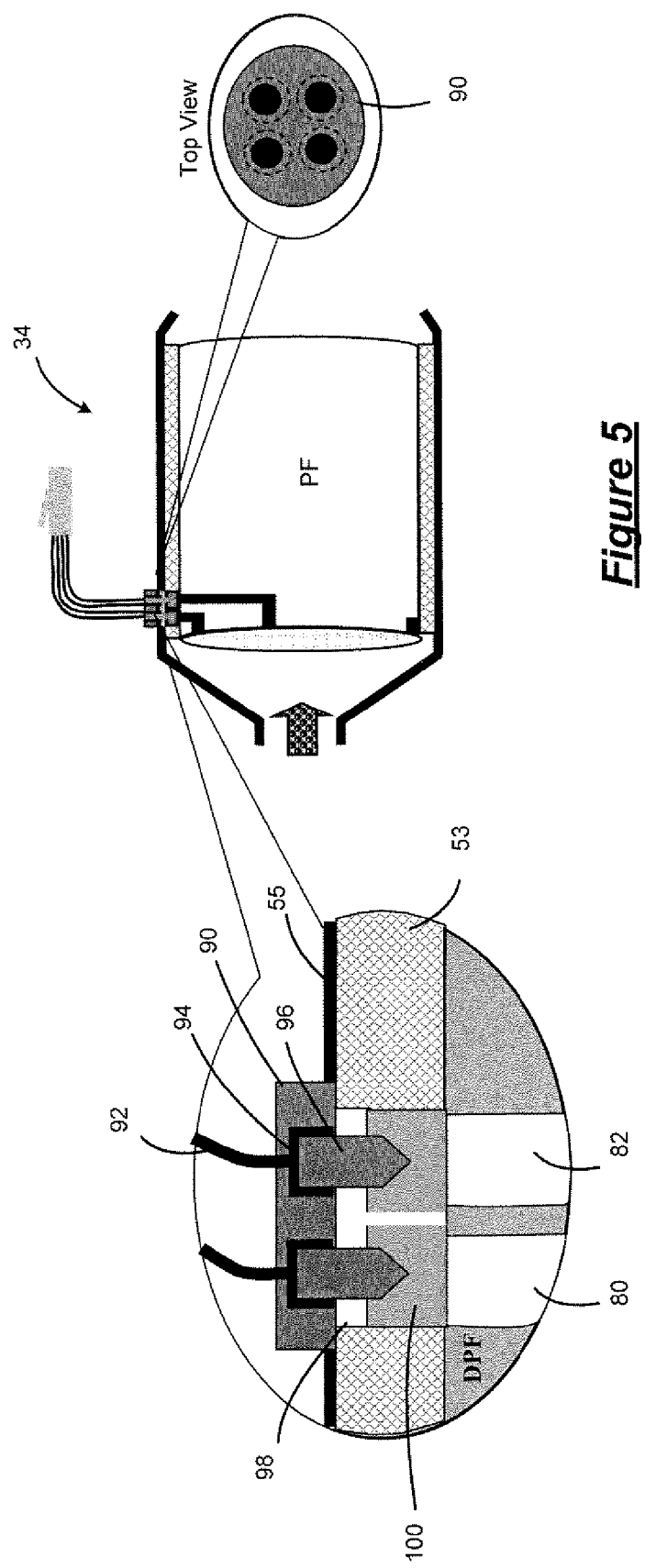
FIG. 5 is a side view of the PF including a detailed view of an electrical connection to the PF.

FIG. 5 illustrates an electrical connection system to facilitate zoned heating of the front face of the PF 34 via a single point connection. A conducting mesh material 100 (e.g. Grafoil) is embedded within the PF mat 53. An insulating material 98 (e.g. alumina) separates the conducting mesh material 100 into segments based on the number of zones within the PF 34. Provided the example in FIG. 4, where the front face of the PF 34 is segmented into three zones, the conducting mesh material 100 is separated into four segments, three relating to the positive terminals of zones 70-74 and one relating to the negative terminal. The conducting mesh material 100 electrically communicates with the printed circuit connections 80-82. A connection 90 includes pins 96 that are press fit into the connection 90. An insulating seal 94 surrounds the pins 96. The pins 96 attach to high temperature insulated wires 92 to complete the connection to the vehicle power source 46 of FIG. 1. It is appreciated that a pigtail configuration may be used to connect to the vehicle's electrical system.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A particulate filter system, comprising:
    an outer shell defining an upstream opening and a downstream opening;
    a particulate filter (PF) that includes a non-conductive outer surface and is disposed within the outer shell;
    an electrical grid that is arranged between the upstream opening and the PF and that is segmented into a plurality of heating zones that can be independently electrically actuated;
    an outer mat disposed between the non-conductive outer surface of the particulate filter and the outer shell;
    an electrical connector coupled to the outer shell; and
    a plurality of printed circuit connections that are at least one of printed and etched on the nonconductive outer surface of the PF and are electrically connected to the electrical connector and each of the plurality of heating zones.

2. The system of claim 1 wherein:

the electrical connector includes a plurality of pins;

a plurality of segments of conducting mesh material that are embedded in the outer mat to connect the plurality of pins to the plurality of printed circuit connections, and each of the plurality of segments of the conducting mesh material are separated from other ones of the plurality of segments of the conducting mesh material by an insulating material.

3. The system of claim 2 further comprising a plurality of pads formed on the non-conductive outer surface that electrically connect the plurality of printed circuit connections and the plurality of segments of the conducting mesh material, respectively.

4. The system of claim 2 further comprising insulated Teflon wires electrically connected to the plurality of pins and extending from the electrical connector.

5. The system of claim 4 wherein the insulated Teflon wires form a pigtail configuration.

6. The system of claim 2 wherein the conducting mesh material includes Grafoil.

7. The system of claim 2 wherein the insulating material includes alumina.

* * * * *